United States Patent
Baeumer et al.

(10) Patent No.: US 8,378,307 B2
(45) Date of Patent: Feb. 19, 2013

(54) SPECTRAL IMAGING

(75) Inventors: Christian Baeumer, Hergenrath (BE);
Christoph Herrmann, Aachen (DE);
Roger Steadman, Aachen (DE); Walter Ruetten, Linnich (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 29 days.

(21) Appl. No.: 13/263,851

(22) PCT Filed: Mar. 15, 2010

(86) PCT No.: PCT/IB2010/051101
§ 371 (c)(1),
(2), (4) Date: Oct. 11, 2011

(87) PCT Pub. No.: WO2010/119358
PCT Pub. Date: Oct. 21, 2010

(65) Prior Publication Data
US 2012/0032085 A1   Feb. 9, 2012

Related U.S. Application Data

(60) Provisional application No. 61/169,761, filed on Apr. 16, 2009.

(51) Int. Cl.
*G01T 1/10* (2006.01)
(52) U.S. Cl. ...................................... 250/362
(58) Field of Classification Search ................. 250/362, 250/363.01–363.1, 370.01–370.15; 378/98.8
See application file for complete search history.

(56) References Cited

U.S. PATENT DOCUMENTS

| | | | |
|---|---|---|---|
| 6,624,422 B2 * | 9/2003 | Williams et al. | 250/363.09 |
| 6,836,523 B2 | 12/2004 | Tarumi et al. | |
| 7,127,027 B2 | 10/2006 | Hoffman | |
| 7,450,683 B2 | 11/2008 | Tkaczyk et al. | |
| 2002/0109091 A1 | 8/2002 | Overdick et al. | |
| 2007/0114426 A1 | 5/2007 | Tkaczyk | |
| 2008/0099689 A1 | 5/2008 | Nygard et al. | |
| 2008/0240339 A1 | 10/2008 | Du et al. | |

FOREIGN PATENT DOCUMENTS

| | | |
|---|---|---|
| EP | 1617237 A1 | 1/2006 |
| WO | 2006111883 A2 | 10/2006 |
| WO | 2008078255 A2 | 7/2008 |
| WO | 2009115956 A2 | 9/2009 |

OTHER PUBLICATIONS

Dubridge, R. A.; Campbell Theorem-System Concepts and Results; 1967; IEEE Trans. on Nuclear Science; 14(1) 241-246.

(Continued)

*Primary Examiner* — Kho Kim

(57) ABSTRACT

An imaging system includes a scintillator array (202) and a digital photomultiplier array (204). A photon counting channel (212), an integrating channel (210), and a moment generating channel (214) process the output signal of the digital photomultiplier array (204). A reconstructor (122) spectrally resolves the first, the second and the third output signals. In one embodiment, a controller (232) activates the photon counting channel (212) to process the digital signal only if a radiation flux is below a predetermined threshold. An imaging system includes at least one direct conversion layer (302) and at least two scintillator layers (304) and corresponding photosensors (306). A photon counting channel (212) processes an output of the at least one direct conversion layer (302), and an integrating channel (210) and a moment generating channel (214) process respective outputs of the photosensors (306). A reconstructor (122) spectrally resolves the first, the second and the third output signals.

26 Claims, 4 Drawing Sheets

OTHER PUBLICATIONS

Kraft, E., et al.; Counting and Integrating Readout for Direct Conversion X-ray Imaging: Concept, Realization and First Prototype Measurements; 2007; IEEE Trans. on Nuclear Science; 54(2)383-390.

Roessl, E., et al.; On the influence of noise correlations in measurement data on basis image noise in dual-energylike x-ray imaging; 2007; Med. Phys.; 34(3)959-966.

* cited by examiner

SPECTRAL IMAGING

CROSS REFERENCE TO RELATED APPLICATIONS

This application claims the benefit of U.S. provisional application Ser. No. 61/169,761 filed Apr. 16, 2009, which is incorporated herein by reference.

The following generally relates to spectral imaging and finds particular application to spectral computed tomography (CT). However, it is also amenable to other medical and non-medical applications.

A conventional integrating computed tomography (CT) scanner generally includes an x-ray tube mounted on a rotatable gantry opposite a detector array. The x-ray tube rotates around an examination region and emits polychromatic radiation that traverses the examination region. The detector array receives radiation that traverses the examination region and generates a signal indicative thereof that includes spectral information.

Unfortunately, in integrating mode, this signal is integrated over the energy spectrum during each integration period, producing a signal indicative of a mean intensity value for each integration period, and the spectral information is lost. The mean signal is reconstructed to generate volumetric image data, which can be processed to generate an image of a scanned subject or object. Such an image generally includes pixels that are represented in terms of gray scale values corresponding to relative radiodensity, which reflects the attenuation characteristics of the scanned subject or object.

Various techniques have been proposed to leverage the spectral information in the detector signal. However, there is an unresolved need for other techniques that leverage the spectral information in the detector signal.

Aspects of the present application address the above-referenced matters and others.

In accordance with one aspect, an imaging system includes a detector array with a scintillator array that receives radiation and generates a light signal indicative thereof and a digital photomultiplier array, optically coupled to the scintillator array that receives the light signal and generates a digital signal indicative thereof. A pre-processor includes a photon counting channel that processes the digital signal and generates a first output signal, an integrating channel that processes the digital signal and generates a second output signal, and a moment generating channel that processes the digital signal and generates a third output signal. A reconstructor spectrally resolves the first, the second and the third output signals.

According to another aspect, an imaging system includes a detector array with at least one photon counting layer and at least two scintillator layers and corresponding photosensors. A pre-processor includes a photon counting channel that processes an output of the at least one photon counting layer and generates a first output signal, an integrating channel that processes respective outputs of the photosensors and generates a second output signal, and a moment generating channel that processes the outputs of the photosensors and generates a third output signal. A reconstructor spectrally resolves the first, the second and the third output signals.

According to another aspect, a method includes detecting radiation via a scintillator array of an imaging detector array and generating a signal via a digital photomultiplier array of the imaging detector array based on the detected radiation. The method further includes processing the signal via a photon counting channel if a radiation flux satisfies a predetermined threshold, processing the signal via an integrating channel, and processing the signal via a moment generating channel. The method further includes energy resolving the detected radiation based on output signals of the photon counting channel, the integrating channel, and the moment generating channel.

According to another aspect, a method includes detecting radiation via one or more direct conversion material layers of an imaging detector array and detecting radiation via one or more scintillator material layers of the imaging detector array and generating a signal indicative thereof via one or more corresponding photosensors. The method further includes processing an output of the one or more direct conversion material layers with a photon counting channel if a radiation flux satisfies a predetermined threshold, processing an output of the one or more photosensors via an integrating channel, and processing the output of the one or more photosensors via a moment generating channel. The method further includes energy resolving the detected radiation based on output signals of the photon counting channel, the integrating channel, and the moment generating channel.

The invention may take form in various components and arrangements of components, and in various steps and arrangements of steps. The drawings are only for purposes of illustrating the preferred embodiments and are not to be construed as limiting the invention.

Figure 1:
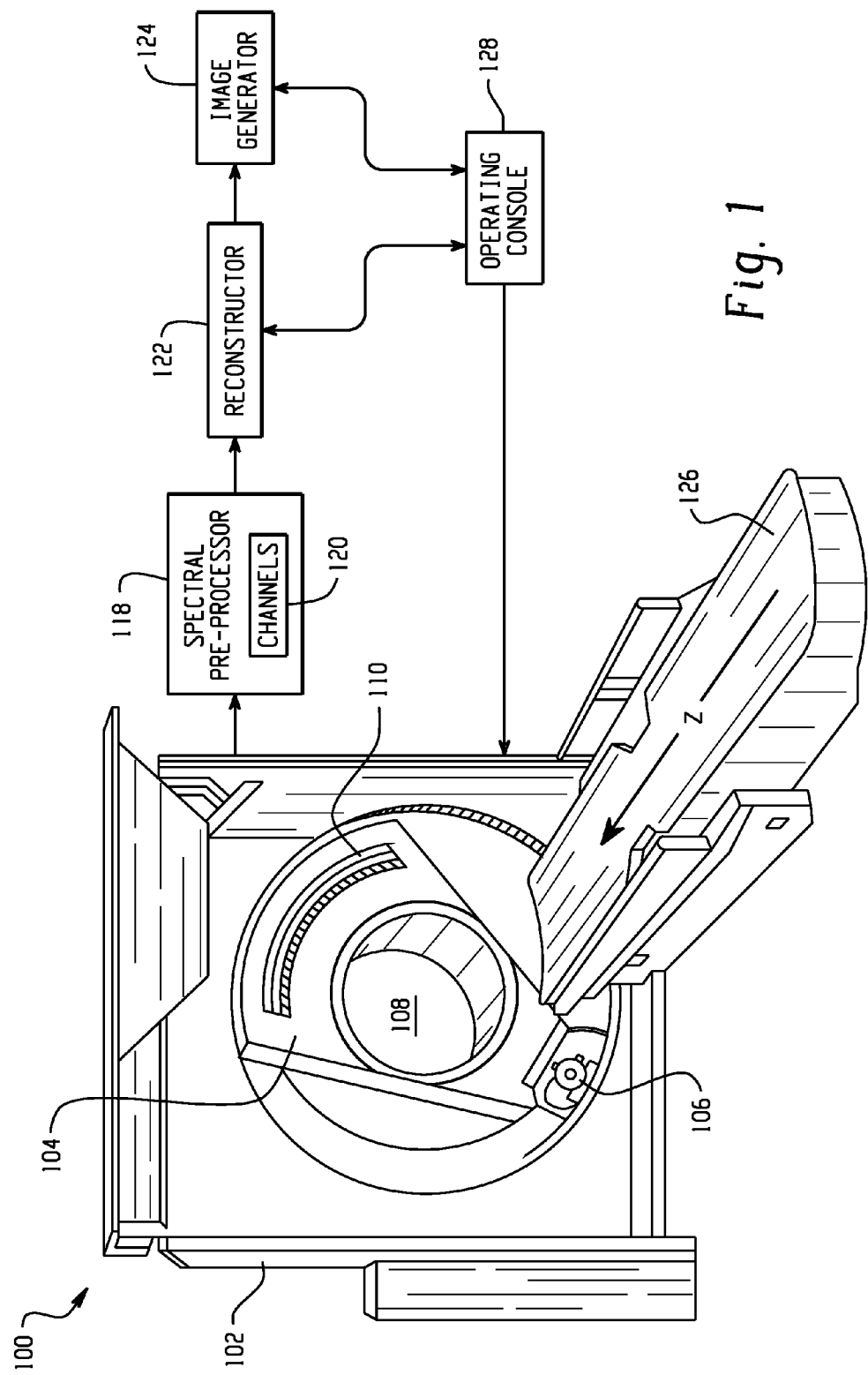
FIG. 1 illustrates an example imaging system.

FIG. 1 illustrates an imaging system 100 such as a computed tomography (CT) scanner. The system 100 includes a generally stationary gantry 102 and a rotating gantry 104. The rotating gantry 104 is rotatably supported by the generally stationary gantry 102. A radiation source 106, such as an x-ray tube, is supported by the rotating gantry 104 and rotates therewith around an examination region 108 about a longitudinal or z-axis, and emits polychromatic radiation. A source collimator or the like collimates radiation emitted by the radiation source 106, producing a generally cone, fan, wedge or otherwise-shaped radiation beam that traverses the examination region 108.

A detector array 110 subtends an angular arc opposite the examination region 108 relative to the radiation source 106. The illustrated detector array 110 includes a two-dimensional array of detector pixels. The detector array 110 receives radiation that traverses the examination region 108 and generates a signal indicative thereof. As described in greater detail below, in one non-limiting embodiment the detector array 110 includes a scintillator array (e.g., gadolinium oxysulfide (GOS) based or the like) optically coupled with a digital photosensor array having a plurality of low noise digital photosensor pixels. In another non-limiting embodiment described below, the detector array 110 includes one or more direct conversion detection layers (e.g., cadmium zinc telluride (CZT), cadmium telluride (CdTe), silicon (Si)) and one or more scintillator detection layers. In one variation, one or more fast scintillators layers can be employed in alternative to or in addition to the direct conversion detection layers. With both of these embodiments, as well as with other embodiments, the detector array 110 output signal includes spectral information that can be used to determine spectral information about detected radiation over the entire or a predetermined sub-portion of a dynamic range of the detector array 110, for high and low radiation fluxes.

A spectral pre-processor 118 processes the detector signal. As described in greater detail below, in one non-limiting embodiment the pre-processor 118 includes a plurality of processing channels 120, including a photon counting channel, an integrating channel, and a moment generating channel. The processing channels 120 independently process the signal from the detector array 110 and collectively generate a set of signals that can be spectrally resolved in the projection domain and/or the image domain. A reconstructor 122 reconstructs the signals using a spectral reconstruction algorithm or spectral decomposition that spectrally decomposes the signals to obtain various components such as photo-electric and Compton components, and/or one or more K-edge components. Additionally or alternatively, a conventional reconstruction can be performed, and the reconstructed signals can be spectrally resolved based on images generated therewith. An image generator 124 can be used to generate images.

The scanner 100 also includes a couch or patient support 126 that supports a subject, such as a human or animal, or an object within the examination region 108. The support 126 is movable, which enables an operator or the system to suitably position the subject within the examination region 108 before, during and/or after scanning. A computing system such as an operator console 128 facilitates user interaction with the scanner 100. Software applications executed by the operator console 128 allow the user to configure and/or control operation of the scanner 100. For instance, the user can interact with the operator console 128 to select a spectral or conventional imaging protocol.

Figure 2:
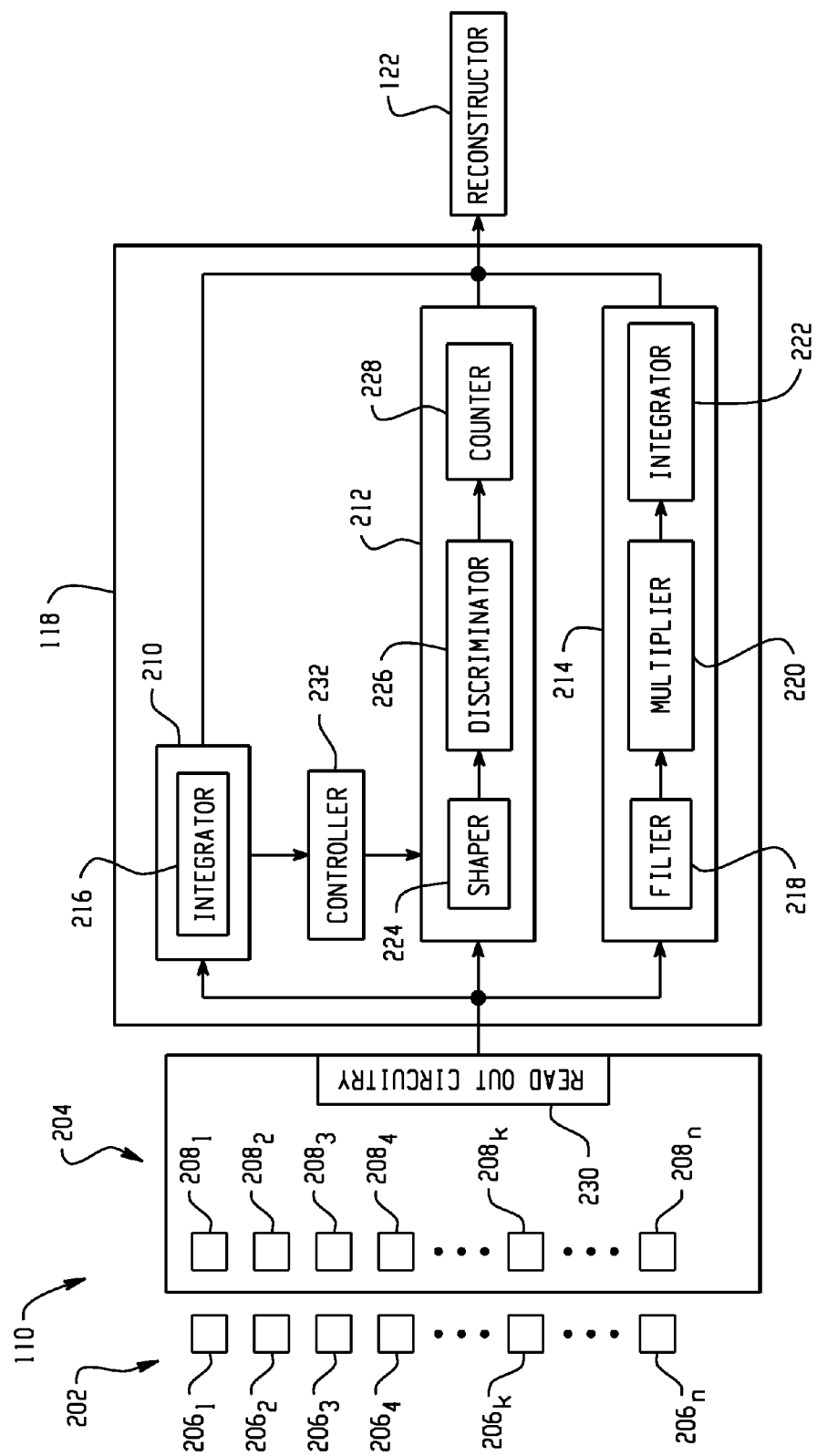
FIG. 2 illustrates an example detector and pre-processing electronics.

FIG. 2 illustrates an example embodiment in which the detector array 110 includes a scintillator array 202 that is optically coupled to a low noise photosensor array 204 such as a digital silicon photomultiplier array. In the illustrated embodiment, the scintillator array 202 includes a plurality of scintillator pixels $206_1, 206_2, \ldots, 206_k, \ldots, 206_n$ (collectively referred to herein as scintillator pixels 206), and the photosensor array 204 includes a plurality of complementary digital silicon photomultiplier pixels $208_1, 208_2, \ldots, 208_k, \ldots, 208_n$ (collectively referred to herein as photomultiplier pixels 208). The photosensor array 204 samples the output of the scintillator pixels 206 and generates a digital signal indicative thereof.

By way of non-limiting example, the scintillator pixel $206_k$ generates an optical signal indicative of radiation impinging thereon, and the photomultiplier pixel $208_k$ samples the optical signal during an integration period and generates a digital signal indicative thereof for the integration period. In one instance, the photomultiplier pixel $208_k$ samples the signal during a sampling period ($T_{cycle}=1/f_s$, where $f_s$ is a predetermined sampling frequency) with a temporal sampling that can be faster than the integration period. The optical signal is registered by the individual cells of the photomultiplier pixel $208_k$, and read out circuitry 230 accumulates the count numbers of the cells of the photomultiplier pixel $208_k$ within a given integration period and generates an output signal.

The above is described in greater detail in connection with international patent application serial number PCT/IB2009/051034, filed on Mar. 12, 2009, and entitled "Single Photon Radiation Detector," the entirety of which is incorporated herein by reference. An example of a suitable photosensor array is discussed in patent application serial number PCT/IB2006/051089, file on 10 Apr. 2006, entitled "Digital Silicon Photomultiplier for TOF-PET," and published as WO/2006/111883, the entirety of which is incorporated herein by reference. Note that in the above application the integration period generally is longer than in the integration period in the embodiments illustrated herein.

In this embodiment, the pre-processor 118 includes at least three channels, including an integrating channel 210, a photon counting channel 212, and a moment generating channel 214. The pre-processor 118, including its channels, can be implemented with a field-programmable gate array (FPGA), a digital signal processor (DSP), or the like. Generally, the integrating channel 210 includes an integrator 216 that averages the detector signal, for an integration period. A suitable moment generating channel 214 includes a filter 218, a multiplier 220 and an integrator 222. The filter 218 filters the direct current (DC) component in the output signal, the multiplier 220 is configured to square the filtered data, and the integrator 222 integrates the squared, filtered data and generates an estimate of the second ($2^{nd}$) central moment of the electrical signal over an integration period.

The photon counting channel 212 identifies radiation events. In one non-limiting embodiment, this can be achieved with a signal shaper 224, an energy discriminator 226, and a counter 228. The signal shaper 224 processes the detector output signal and generates a pulse indicative of the detected radiation. The energy discriminator 226 energy-discriminates the pulse, which may include comparing the amplitudes of the pulse with one or more predetermined energy thresholds, such as three or four thresholds for K-edge imaging. In one instance, the energy discriminator 226 produces an output signal, for each threshold, indicative of whether the amplitude meets the corresponding threshold. The counter 228 counts the number of times the signal meets each threshold. The counts can be binned amongst a plurality of energy windows, allowing for spectrally discrimination of the detected photons. In another embodiment, the photon counting channel 212 also includes an integrator that processes the signal before the signal shaper 224.

In the illustrated embodiment, the photon counting channel 212 is activated only if the measured radiation flux, which can be determined based on the output of the integrating channel 210, is below a predetermined flux threshold, which can correspond to a lower or other flux level. As such, the photon counting channel 212 can be selectively activated to process the detector array 110 output for certain fluxes (e.g., lower fluxes such as below one million counts per second), and deactivated for other flux levels such as at flux levels at which the output of the photon counting channel 212 may not be well-suited for spectral imaging, such as when the direct conversion material is in saturation (e.g., intermediate, such as between one million and ten million counts per second, and higher fluxes, such as above ten million counts per second). The illustrated embodiment includes a controller 232 that processes the output of the integrating channel 210 and generates a control signal, based thereon, that controls the photon counting channel 212 such as activating the photon counting channel 212 when the flux satisfies the predetermined flux threshold level. In other embodiments, other techniques can be employed to estimate the radiation flux and/or the photon counting channel 212 can always be activated during data acquisition.

As discussed above, the signals from the channels 210, 214 and 212 can be spectrally resolved in the projection domain and/or the image domain. This includes decomposing the signal to obtain photo-electric and Compton, or photo-electric, Compton and one or more K-edge components. In this illustrated embodiment, the signals from the channels 210, 214 and 212 are processed by the reconstructor 122.

By employing a digital photomultiplier based detector array 110, the noise from the electronics is relatively low, relative to a configuration in which the detector array includes conventional photodiodes. This allows for employing the moment generating channel 214 over the full or a substantial portion of the detection dynamic range, rather than just at higher fluxes as when the detector array 110 is configured with conventional photodiodes. As such, both the integrating channel 210 and the moment generating channel 214 can be concurrently employed over the full or a substantial portion of the detection dynamic range. This allows for at least two different spectral measurements to be acquired during data acquisition for each detector pixel. At lower fluxes (e.g., less than one (1) million counts per second (Mcps)), the photon counting channel 212 can be used to provide additional spectral information (in addition to the spectral information from the integrating and moment generating channels 210 and 214) or alternative spectral information (in place of the spectral information from one or more of the integrating and moment generating channels 210 and 214).

Although the above is described in connection with a single scintillator array, in another embodiment the detector array includes two (2) or more scintillator arrays, each being coupled to a corresponding digital photomultiplier array. In the case of two layers of scintillator arrays, at least four (4) independent measurements are available over the entire dynamic range, and six (6) independent measurements are available at lower fluxes if all three channels 210, 214 and 212 are being employed. This allows for decomposing the signal to obtain photo-electric, Compton, and K-edge (which requires at least three (3) independent measurements) components.

Figure 3:
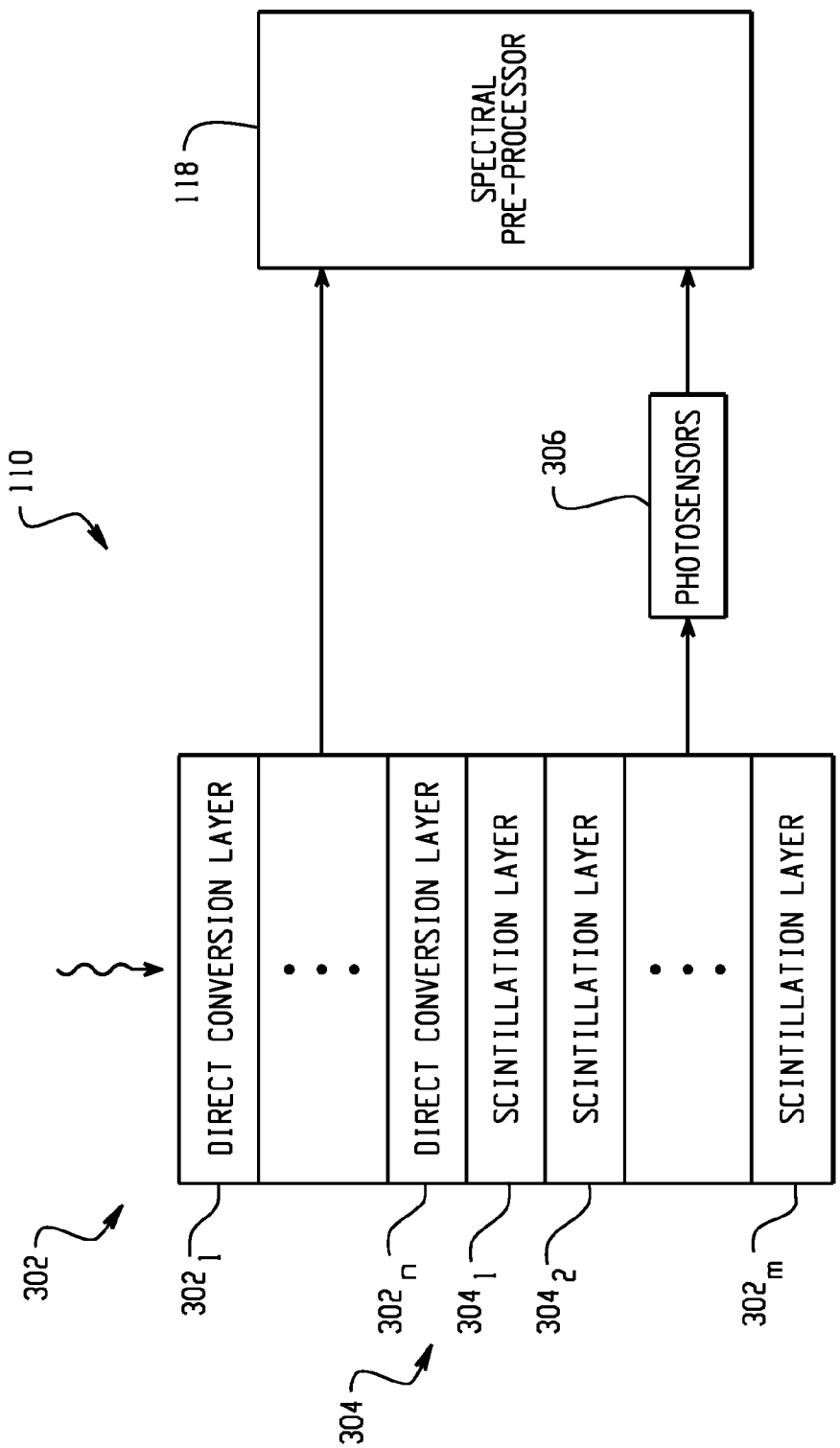
FIG. 3 illustrates another example detector configuration.

FIG. 3 illustrates an embodiment in which the detector array 110 includes multiple layers. The illustrated detector array 110 includes one or more direct conversion layers 302 and two or more scintillators layers 304. The one or more direct conversion layers 302 includes layers $302_1, \ldots, 302_n$, and the two or more scintillators layers 304 includes m layers $304_1, 304_2, \ldots, 304_m$. In the illustrated embodiment, the layers are arranged with respect to each other such that the direct conversion layers 302 are nearer to the incoming radiation. In other embodiment, the layers can be otherwise arranged.

With this embodiment, the output of at least one of the direct conversion layers 302 can be processed by photon-counting electronics such as the photon-counting channel 212 discussed herein in connection with FIG. 2 or other photon-counting electronics. The scintillator layers 304 are optically coupled to respective photosensors 306 such as photodiodes or other photosensitive pixels, and the output of the photosensors 306 can be processed by integrating and/or the moment generating electronics such as the integration and/or moment generating channels 210 and 214 discussed herein in connection with FIG. 2 or other integration and/or moment generating electronics. Although the photosensors 306 are shown to a side of the scintillator layer 304, the photosensors 306 can be located below the scintillator layers 304, on a side opposite of the direct conversion layers 302, or otherwise.

Configuring the detector array 110 with both the direct conversion layers 302 and the scintillator layers 304 allows for spectral imaging, including K-edge imaging (which requires at least three (3) simultaneous independent measurements). By way of non-limiting example, assume a configuration in which the detector array 110 includes one direct conversion layer 302 (with at least three (3) or four (4) energy windows) and two scintillator layers 304. When the radiation flux is lower, the output of the moment generating channel may not be well-suited for spectral imaging. However, the output of the photon counting channel provides three (3) simultaneous independent measurements and output of the integration channel provide two (2) more simultaneous independent measurements. The simultaneous independent measurements allow for spectral imaging, including K-edge imaging.

When the radiation flux is higher and the direct conversion layer 302 is in saturation, the output of the integration electronics provide two (2) simultaneous independent measurements and the output of the moment generating electronics provide two (2) simultaneous independent measurements, or four (4) total simultaneous independent measurements, which allows for spectral imaging, including K-edge imaging. As such, the illustrated detector array 110 can provide spectral information for lower and higher radiation fluxes during the same scan, including instances in which the radiation illuminating the detector array 110 is highly attenuated by structure in the examination region, lightly attenuated by the structure in the examination region, or unattenuated by the structure in the examination region (e.g., where the radiation directly illuminates the detector array 110 without traversing the structure).

The above discusses an embodiment with one direct conversion layer 302 and two scintillator layers 304. The following describes the measured values M for the more general case of n direct conversion layers 302 and (N–n) scintillator layers 304:

$$M_k^{(l)} = \begin{cases} \int S_{inc}(E) \cdot \left( \int f^{(l)}(E, E_{dep}) dE_{dep} \right) dE & l = 1, \ldots, n; k = 1, \ldots, N_{EWin} \\ \int S_{inc}(E) \cdot \left( \int E_{dep} \cdot f^{(l)}(E, E_{dep}) dE_{dep} \right) dE & l = n+1, \ldots, N; k = 1 \\ \int S_{inc}(E) \cdot \left( \int E_{dep}^2 \cdot f^{(l)}(E, E_{dep}) dE_{dep} \right) dE & l = n+1, \ldots, N; k = 2 \end{cases}$$

wherein $S_{inc}$ represents the energy spectrum of photons illuminating the detector array 110, $f^{(l)}(E, E_{dep})$ represents the detector response, $E_{dep}$ represents the deposited energies for a large number of photons of single energy E illuminating the detector array 110, l represents the (serial) number of detector array layers, k represents the (serial) number of measurements for each mode (counting, integration and moment generating) for a given integration period, and $N_{EWin}$ represents the count of energy windows.

Although the illustrated embodiment shows horizontally stacked layers, other layer arrangements, such as vertically stacked layers, are contemplated herein. In addition, the direct conversion layer may be formed from the same or different direct conversion materials (e.g., such as CZT, CdTe, Si, etc.). In one embodiment, a fast scintillator layer may be used instead of a direct conversion layer. Likewise, the scintillator layers may be formed from the same or different scintillation materials. Moreover, the dimensions of one or more of the various layers may be similar or different.

The detector array 110 can also be employed with kVp-switching and/or a multi-tube system. With kVp switching, the tube is switched between at least two different voltages, which changes the emission spectrum. As such, the detector array 110 can generate first signals corresponding to a first emission spectrum and second signals corresponding to a second emission spectrum. With a multi-tube system, each tube is operated with a different tube voltage, proving first and second signals corresponding to first and second emission spectra. In both instances, the resulting signals can be used to obtain four (4) measurements, two from the integrating electronics and two from the moment generating electronics.

Figure 4:
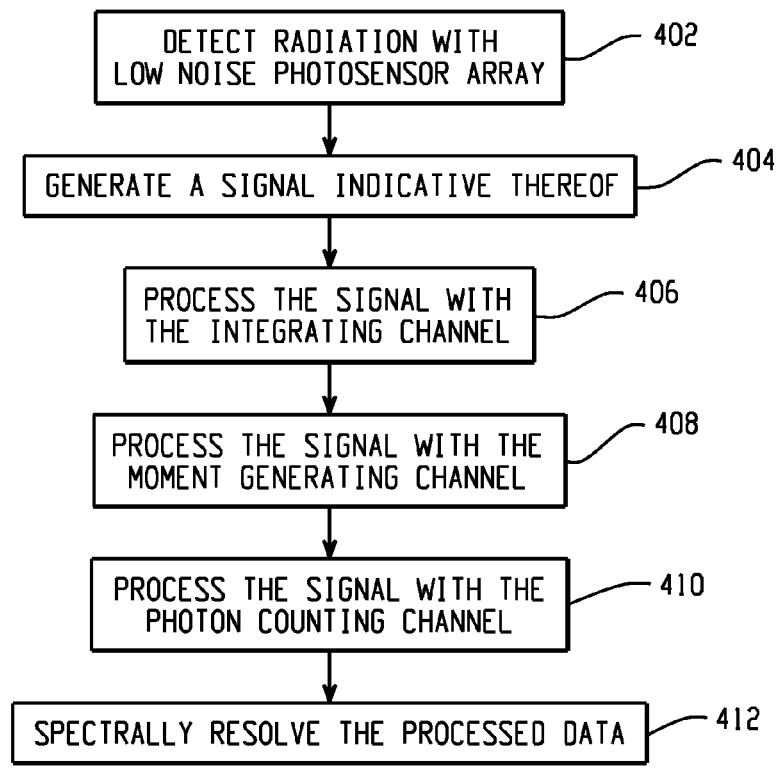
FIGS. 4 and 5 illustrate example methods.

FIG. 4 illustrates a method. It is to be appreciated that the ordering of the acts is provided for explanatory purposes and may be different. In addition, some of the acts may be concurrently performed. At 402, polychromatic radiation traversing an examination region is detected via low noise photosensors such as digital photomultipliers. At 404, the digital photomultipliers generates and outputs a digital signal indicative of the detected radiation. At 406, the signal is processed by the integrating channel 210, which generates a mean value based on the signal. At 408, the signal is processed by the moment generating channel 214, which generates a higher order moment based on the signal. At 410, the signal is processed via the counting channel 212, which resolves the detected radiation over a predetermined set of energy windows, based on the radiation flux, which can be determined based on the output of the integrating channel 210 or otherwise. At 412, the output of the integrating channel 210, the moment generating channel 214, and/or the counting channel 212 is spectrally resolved as described herein or otherwise.

Figure 5:
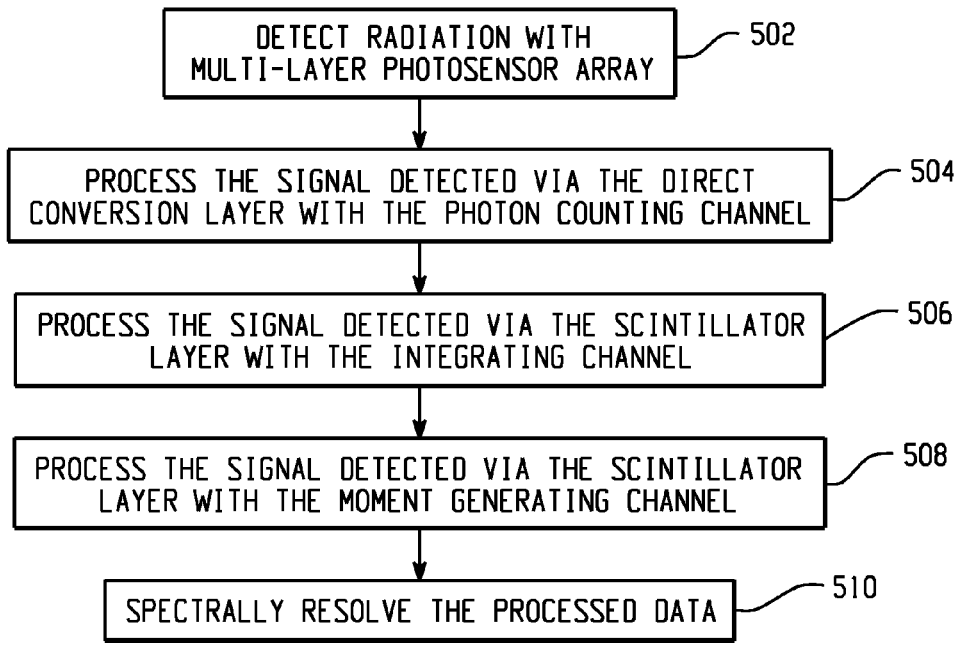

FIG. 5 illustrates a method. At 502, polychromatic radiation traversing an examination region is detected via a detector having one or more direct conversion layers and one or more scintillator layers. At 504, the counting channel 212 processes the signal from the direct conversion layer over a plurality of predetermined energy windows, if the radiation flux satisfies a first predetermined threshold. At 506, the integrating channel 210 integrates the signal from the scintillator layer over the integration period, generating a mean value for the integration period. At 508, moment generating channel 214 generates a higher order moment based on the signal from the scintillator layer, if the radiation flux satisfies a second predetermined threshold. At 510, the output of the integrating channel 210, the moment generating channel 214, and/or the counting channel 212 is spectrally resolved as described herein or otherwise.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

What is claimed is:

1. An imaging system, comprising:
    a detector array including:
        a scintillator array that receives radiation and generates a light signal indicative thereof; and
        a digital photomultiplier array, optically coupled to the scintillator array, that receives the light signal and generates a digital signal indicative thereof;
    a pre-processor, including:
        a photon counting channel that processes the digital signal and generates a first output signal;
        an integrating channel that processes the digital signal and generates a second output signal; and
        a moment generating channel that processes the digital signal and generates a third output signal; and
    a reconstructor that spectrally resolves the first, the second and/or the third output signals.

2. The imaging system of claim 1, wherein the reconstructor spectrally resolves the second and third output signals respectively of the integrating channel and the moment generating channel at intermediate and higher radiation fluxes.

3. The imaging system of claim 1, wherein the reconstructor spectrally resolves the first signal of the photon counting channel at lower radiation fluxes.

4. The imaging system of claim 1, wherein the reconstructor spectrally resolves all three of the first, second and third signals at lower radiation fluxes.

5. The imaging system of claim 1, further including controller that selectively activates the photon counting channel, wherein the controller activates the photon counting channel to process the digital signal based on the second output signal of the integrating channel.

6. The imaging system of claim 5, wherein the controller activates the photon counting channel to process the digital signal only if a radiation flux determined based on the second output is below a predetermined threshold.

7. The imaging system of claim 1, wherein the pre-processor provides at least two independent simultaneous energy dependent signals, and the reconstructor spectrally resolves the two signals into photo-electric and Compton components.

8. The imaging system of claim 1, wherein the pre-processor provides at least three independent simultaneous energy dependent signals, and the reconstructor spectrally resolves the three signals into photo-electric, Compton, and K-edge components.

9. The imaging system of claim 1, wherein the photon counting channel is configured with at least three energy windows for K-edge imaging.

10. An imaging system, comprising:
    a detector array including:
        at least one direct conversion layer; and
        at least two scintillator layers and corresponding photosensors;
    a pre-processor, including:
        a photon counting channel that processes an output of the at least one direct conversion layer and generates a first output signal;
        an integrating channel that processes outputs of the photosensors and generates a second output signal; and
        a moment generating channel that processes the outputs of the photosensors and generates a third output signal; and
    a reconstructor that spectrally resolves the first, the second and the third output signals.

11. The imaging system of claim 10, wherein the reconstructor processes the first output signal of the photon counting channel for detector pixels of the detector array that detect lower radiation flux levels.

12. The imaging system of claim 10, wherein the moment generating channel processes the output of detector pixels of the detector array that detect intermediate and higher radiation flux levels.

13. The imaging system of claim 10, wherein the integrating channel generates at least two independent simultaneous energy dependent measurements, and the reconstructor spectrally resolves the first and second output signals respectively of the photon counting channel and the output of the integrating channel.

14. The imaging system of claim 10, wherein the integrating channel generates at least two energy dependent measurements and the moment generating channel generates at least two energy dependent measurements, the at least four measurements are four independent simultaneous measurements, and the reconstructor spectrally resolves the at least four measurements.

15. The imaging system of claim 10, wherein the reconstructor, for an integration period, spectrally resolves the first output signal of the photon counting channel for a first subset of detector pixels of the detector array and spectrally resolves the second and third output signals of the integrating channel and the moment generating channel for a second subset of detector pixels of the detector array.

16. A method, comprising:
    detecting radiation with a scintillator array of an imaging detector array;

generating a signal based on the detected radiation with a digital photomultiplier array;
processing the signal with a photon counting channel;
processing the signal with an integrating channel; and
processing the signal with a moment generating channel;
energy resolving the detected radiation based on output signals of the photon counting channel, the integrating channel, and the moment generating channel.

17. The method of claim 16, wherein energy resolving the detected radiation includes energy resolving the output signals of the integrating channel and the moment generating channel at intermediate and higher radiation fluxes.

18. The method of claim 16, wherein energy resolving the detected radiation includes energy resolving the output signal of the photon counting channel, the integrating channel and the moment generating channel at lower radiation fluxes.

19. The method of claim 16, further including selectively activating the photon counting channel to process the signal based on the output signal of the integrating channel.

20. The method of claim 16, further including energy resolving the detected radiation into photo-electric and Compton components, or photo-electric, Compton, and at least one K-edge components.

21. A method, comprising:
detecting radiation with one or more direct conversion material layers of an imaging detector array;
detecting radiation with one or more scintillator material layers of the imaging detector array and generating a signal indicative thereof via one or more corresponding photosensors;
processing an output of the one or more direct conversion material layers with a photon counting channel;
processing an output of the one or more photosensors with an integrating channel;
processing the output of the one or more photosensors with a moment generating channel; and
energy resolving the detected radiation based on output signals of the photon counting channel, the integrating channel, and the moment generating channel.

22. The method of claim 21, wherein energy resolving the detected radiation includes energy resolving the detected radiation based on the output signals of the photon counting channel for detector pixels of the detector array that detect lower flux levels.

23. The method of claim 21, wherein energy resolving the detected radiation includes energy resolving the detected radiation based on the output signals of the photon counting channel for detector pixels of the detector array that detect flux levels lower than about ten million counts per second.

24. The method of claim 21, wherein energy resolving the detected radiation includes energy resolving the detected radiation based on the output signals of the integrating channel and the moment generating channel for detector pixels of the detector array that detect higher flux levels.

25. The method of claim 21, wherein energy resolving the detected radiation includes energy resolving the detected radiation based on the output signals of the integrating channel and the moment generating channel for detector pixels of the detector array that detect flux levels higher than about one million counts per second.

26. The method of claim 21, further including determining a flux levels based on the output signal of the integrating channel.

* * * * *